(12) United States Patent
Stearns

(10) Patent No.: US 8,353,126 B2
(45) Date of Patent: Jan. 15, 2013

(54) BEE SMOKER

(76) Inventor: Daniel Stearns, Marlow, NH (US)

( * ) Notice: Subject to any disclaimer, the term of this patent is extended or adjusted under 35 U.S.C. 154(b) by 549 days.

(21) Appl. No.: 12/573,214

(22) Filed: Oct. 5, 2009

(65) Prior Publication Data
US 2011/0078944 A1  Apr. 7, 2011

(51) Int. Cl.
*A01K 55/00* (2006.01)
(52) U.S. Cl. ............................................ 43/128; 43/127
(58) Field of Classification Search .................... 43/127, 43/128, 125, 129; 102/334; 392/386, 391, 392/407, 409, 410, 416; 131/329, 330, 193, 131/178, 185, 231, 234; 221/135, 136, 143–145; 219/200, 201, 209, 221, 260, 261, 268, 270
See application file for complete search history.

(56) References Cited

U.S. PATENT DOCUMENTS

| | | | | | |
|---|---|---|---|---|---|
| 43,723 | A | * | 8/1864 | Todd | 43/128 |
| 50,752 | A | * | 10/1865 | Vanstone | 43/127 |
| 199,611 | A | * | 1/1878 | Bingham | 43/127 |
| RE8,326 | E | * | 7/1878 | Bingham | 43/128 |
| 264,614 | A | * | 9/1882 | Bingham | 43/128 |
| 473,724 | A | * | 4/1892 | Bingham | 43/128 |
| 478,006 | A | * | 6/1892 | Hill | 431/128 |
| 484,172 | A | * | 10/1892 | Brodbeck | 43/128 |
| 535,677 | A | * | 3/1895 | Crane | 43/128 |
| 559,546 | A | * | 5/1896 | Street et al. | 43/128 |
| 718,689 | A | * | 1/1903 | Bingham | 43/128 |
| 739,510 | A | * | 9/1903 | Root | 43/128 |
| 798,982 | A | * | 9/1905 | Root | 43/128 |
| 800,990 | A | * | 10/1905 | Danzenbaker | 43/128 |
| 834,121 | A | * | 10/1906 | Gladish | 43/128 |
| 856,133 | A | * | 6/1907 | Danzenbaker | 43/128 |
| 1,073,384 | A | * | 9/1913 | Ahern | 43/127 |
| 1,371,801 | A | * | 3/1921 | Mayes | 422/305 |
| 1,386,283 | A | * | 8/1921 | Shrader | 43/128 |
| 1,792,860 | A | * | 2/1931 | Neuls | 43/125 |
| 2,535,177 | A | * | 12/1950 | Volgenau et al. | 43/128 |
| 2,543,409 | A | * | 2/1951 | Jackson | 43/128 |
| 2,561,684 | A | * | 7/1951 | Blundell | 43/128 |
| 2,697,427 | A | * | 12/1954 | Rigali | 219/260 |
| 3,144,545 | A | * | 8/1964 | Shrimplin et al. | 392/407 |
| 3,290,112 | A | * | 12/1966 | Gillenwater et al. | 43/129 |
| 3,778,924 | A | * | 12/1973 | Okui | 43/129 |
| 3,986,670 | A | * | 10/1976 | Syveson | 43/129 |
| 4,037,353 | A | * | 7/1977 | Hennart et al. | 43/129 |
| 4,163,038 | A | * | 7/1979 | Nishimura et al. | 43/129 |
| 4,228,124 | A | * | 10/1980 | Kashihara et al. | 43/129 |
| 4,326,119 | A | * | 4/1982 | Swiatosz | 43/127 |
| 4,615,138 | A | * | 10/1986 | Cale et al. | 43/128 |
| 5,282,334 | A | * | 2/1994 | Kimura et al. | 43/129 |
| 5,644,866 | A | * | 7/1997 | Katsuda et al. | 43/129 |

(Continued)

FOREIGN PATENT DOCUMENTS

| | | | |
|---|---|---|---|
| DE | 3835948 A1 | * | 5/1989 |
| EP | 194210 A1 | * | 9/1986 |
| FR | 2596612 A1 | * | 10/1987 |
| FR | 2657232 A1 | * | 7/1991 |
| FR | 2712775 A1 | * | 6/1995 |
| FR | 2865893 A1 | * | 8/2005 |
| JP | 2009-247265 A | | 10/2009 |
| JP | 2009247265 A | * | 10/2009 |
| WO | 92-03043 A1 | | 3/1992 |
| WO | WO 9203043 A1 | * | 3/1992 |

OTHER PUBLICATIONS

PCT International Report on Patentability, PTC/US2010/051263, Apr. 11, 2012.

*Primary Examiner* — Darren W Ark

(57) ABSTRACT

An improved bee smoker is provided for producing smoke on demand for use in controlling bees that includes a housing, a power source, a heating element, a fan, and switches.

8 Claims, 3 Drawing Sheets

U.S. PATENT DOCUMENTS

| | | | |
|---|---|---|---|
| 5,966,500 A * | 10/1999 | Wollam | 392/386 |
| 6,050,016 A * | 4/2000 | Cox | 43/129 |
| 6,151,827 A * | 11/2000 | Smith et al. | 43/129 |
| 6,443,434 B1 * | 9/2002 | Prather | 43/129 |
| 6,477,890 B1 * | 11/2002 | Hulsebus | 392/394 |
| 6,773,679 B2 * | 8/2004 | Jaworski et al. | 43/129 |
| 6,857,214 B1 * | 2/2005 | Pelissier | 43/129 |
| 7,168,630 B1 * | 1/2007 | Ketcha et al. | 43/125 |
| 7,766,722 B2 * | 8/2010 | Arndt | 43/130 |
| 2004/0170405 A1 * | 9/2004 | Sherwood et al. | 392/397 |
| 2005/0262756 A1 * | 12/2005 | Younger | 43/128 |
| 2008/0178518 A1 * | 7/2008 | Reece | 43/127 |
| 2009/0007482 A1 * | 1/2009 | Sewzyk et al. | 43/129 |
| 2011/0192399 A1 * | 8/2011 | Wilke et al. | 392/390 |

* cited by examiner

BEE SMOKER

CROSS-REFERENCE TO RELATED APPLICATIONS

None.

STATEMENT REGARDING FEDERALLY SPONSORED RESEARCH OR DEVELOPMENT

Not applicable.

FIELD OF THE INVENTION

This invention relates to hand-held smoke generating devices that can be used by bee keepers.

BACKGROUND OF THE INVENTION

Smoke can be used to control bees when bee keepers need to access the hive. Bee keepers have used bee smokers for centuries to create smoke for this purpose. Conventional bee smokers are hand-held devices that generally include a metal can with a lid, a spout, and a handle. A fire is started in the can using any materials that will burn to generate smoke. A pump can be used to bring air to the fire and to eject the smoke, which exits through the spout.

A drawback with conventional bee smokers is that the fire must be burning at all times in order for smoke to be available. If the fire goes out, the bee keeper must re-light the fire, during which time no smoke will be available to control bees. In addition, a constantly burning fire produces smoke and heat even when not needed.

More recently attempts have been made to address some of the shortcomings of conventional bee smokers. For example, a pending U.S. patent application, Publication No. 20050262756, entitled Portable Vapor Bee Smoker, uses a heating source to heat vapor with liquid smoke, which is used as a smoke substitute. However, Publication No. 20050262756 does not disclose the use of actual smoke. Therefore, a need exists for a bee smoker that reliably, easily, and safely produces smoke on demand without the need for continually maintaining a fire in the housing.

Accordingly, it is an object of the present invention to provide a new and improved bee smoker.

Another object of the invention is to provide a hand-held bee smoker that produces smoke on demand without requiring the continual burning of a fire.

Another object of the invention is to provide a bee smoker in which heat and smoke are not generated when not needed.

Another object of the present invention is to provide a bee smoker which is reliable, safe, and easy to use.

BRIEF SUMMARY OF THE INVENTION

A bee smoker is provided in which smoke is generated on demand. This is accomplished by providing a bee smoker that includes a housing, a power source, a heating element, and an on/off switch for controlling the production of smoke.

In another aspect of the invention, an air flow mechanism is included to move smoke and air, so that smoke can be expelled on demand.

In another aspect of the invention, the heating element includes a resistive heat element supported by a thermal and electrical insulating member and the power source is a battery.

DETAILED DESCRIPTION OF THE INVENTION

Figure 1:
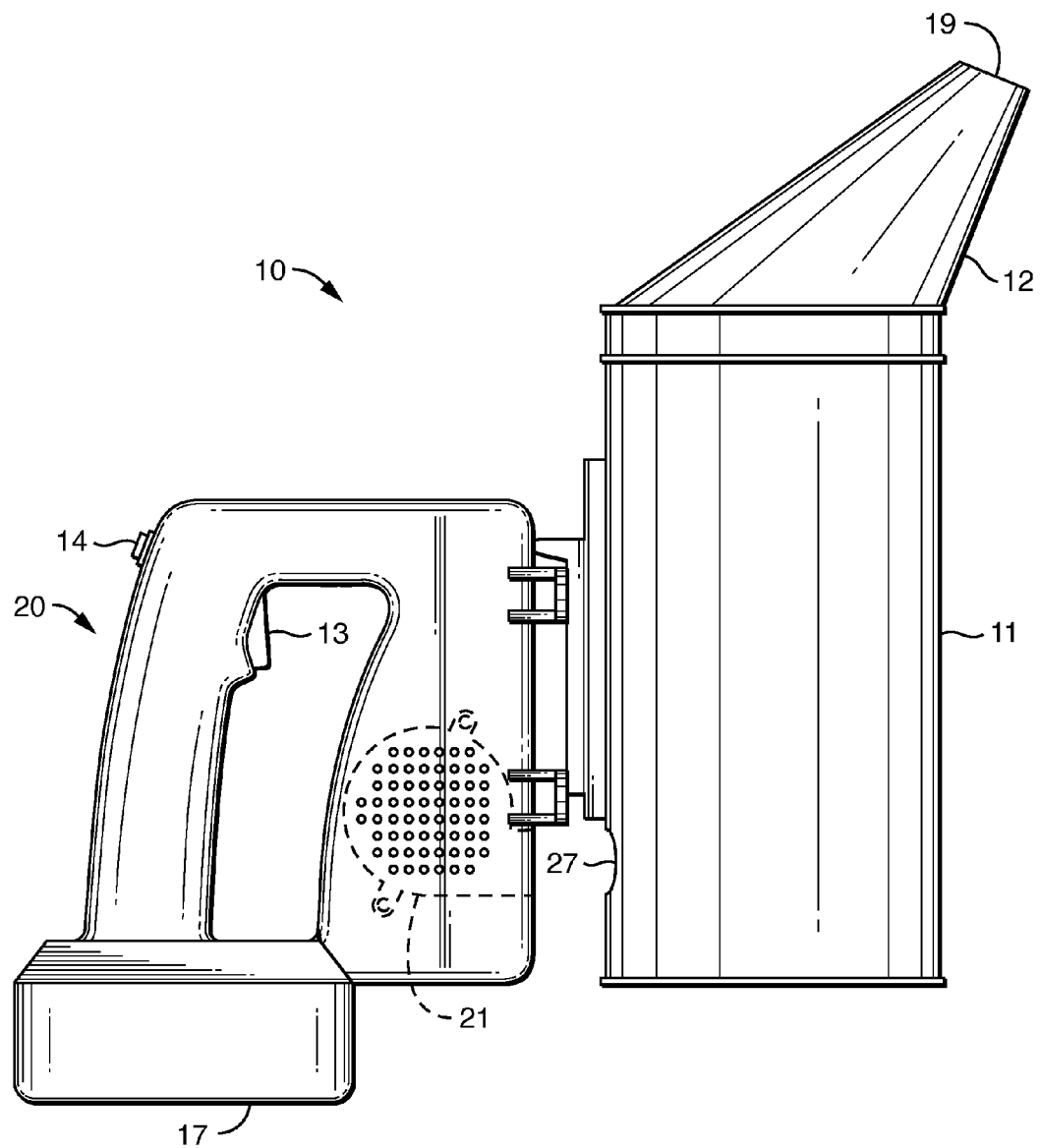
FIG. 1 illustrates an embodiment of a bee smoker in accordance with the present invention.

Bee smokers of the present invention can be of any size or shape provided that they can be carried by a bee keeper and they can be made of standard materials used for conventional bee smokers such as metal. The bee smoker 10 shown in FIG. 1 includes a housing 11 having a handle 20, a lid 12, and a spout 19. Housing 11 is preferably metal, but can also be made of any suitable heat and fire resistant material. The interior of housing 11 is accessible through lid 12 in the embodiment shown in FIG. 1, but side or bottom hatches are also possible. Bee smoker 10 as shown has two switches, smoke switch 13 and fan switch 14, which are shown positioned on handle 20 in the embodiment shown in FIG. 1.

Smoke switch 13 has ON and OFF positions. With smoke switch 13 in the ON position, smoke is generated in the bee smoker in a manner described below. In this way, a bee keeper can use bee smoker 10 to produce smoke when and as needed. When smoke switch 13 returns to the OFF position, smoke will no longer be generated in bee smoker 10 after a short interval. In a preferred embodiment, the default position of smoke switch 13 is the OFF position, where it remains unless it is actively held in the ON position by the user. This can be accomplished through the use of any suitable mechanism, such as a momentary control switch. Fan switch 14 controls air flow mechanism 21 and likewise has ON and OFF positions. Air flow mechanism 21 is an optional alternative to bellows that have been used in conventional bee smokers, which may also be used in conjunction with embodiments of the invention.

Figure 2:
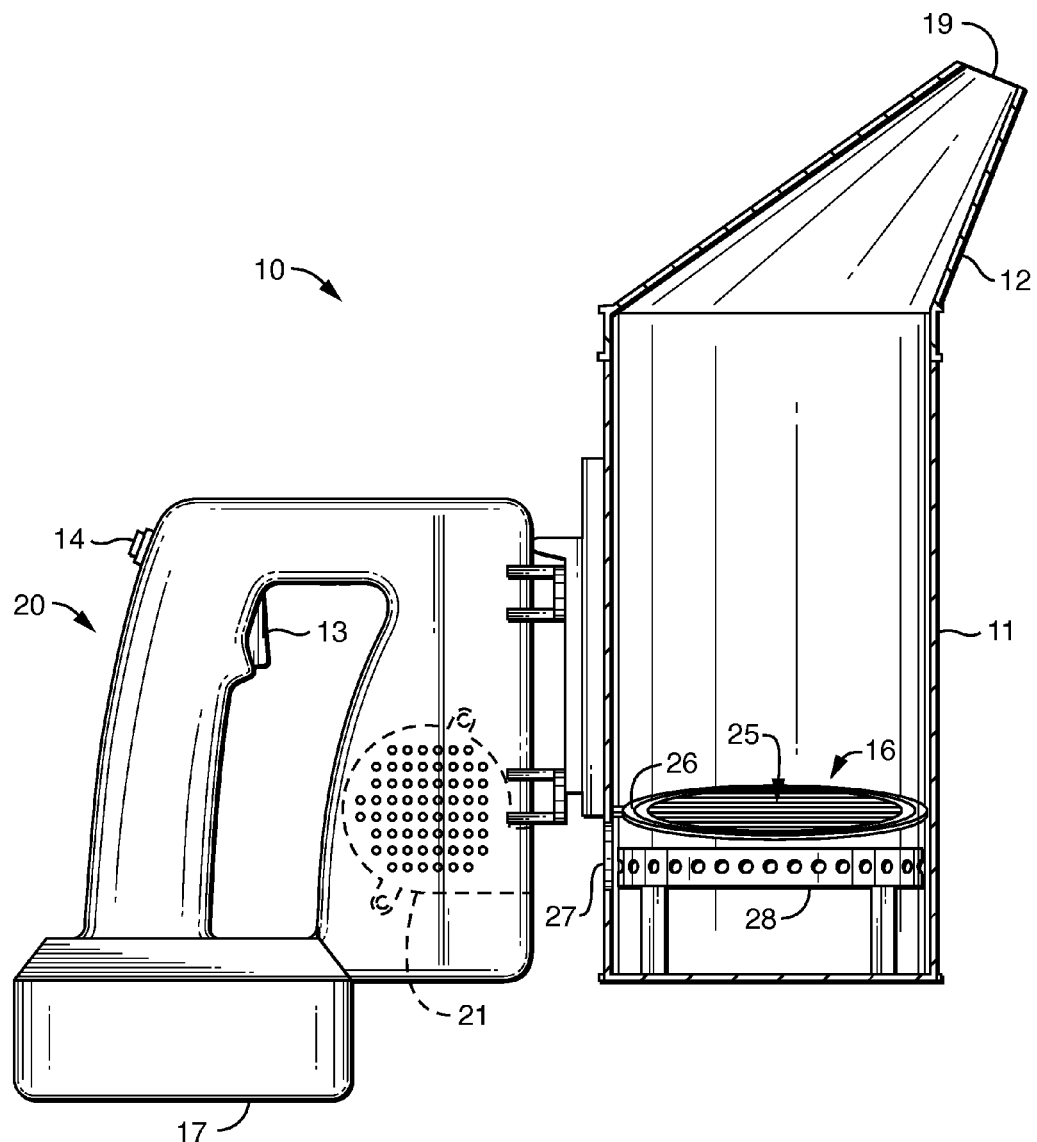
FIG. 2 is a partial cut-away view of the illustration of FIG. 1.

FIG. 2 is a cut-away view of the bee smoker of FIG. 1. The mechanism for producing smoke includes heating element 16 and power source 17. Heating element 16 includes a resistive heat element 25 that can be any suitable material that can be heated to an adequate temperature range, such as about 500-1200 degrees Fahrenheit and preferably about 800-1000 degrees Fahrenheit, to cause a fuel to smolder but not immediately burst into flame. Suitable materials for resistive heat elements are well known in the art and include, for example, carbon, ceramic, nickel-chromium, and tungsten wires. Resistive heat element 25 is arranged in a manner to receive and be in contact with fuel. Such arrangements can include coils, grids, grills, or other configurations. In FIG. 2, resistive heat element 25 is arranged in a grill configuration. Resistive heat element 25 is operably connected to power source 17 using high temperature leads. Heating element 16 also includes a support structure 26 for supporting resistive heat element 25. Support structure 26 can be made from an adequately thermal and electrical insulating material, such as ceramic, silicone bonded muscovite, or silicone bonded phlogopite mica board. Support structure 26 serves to maintain resistive heat element 25 in its configuration and provide additional support when the fuel is in place. Heating element 16 may be secured to housing 11.

Some embodiments also include a draft structure 28 below heating element 16. Draft structure 28 can be constructed from stainless steel or other materials and serves to facilitate the flow of air to heating element 16 to encourage smoldering.

In operation, a fuel is placed in the housing of the bee smoker and is in contact with heating element 16. Suitable fuels include any material capable of smoldering. In a preferred embodiment, wood chips or wood shavings, such as the variety available at pet stores for small animal bedding, preferably dry, are used. Additional fuel can be added as needed through the lid 12 or side access hatches (not shown).

With a fuel in contact with heating element 16, smoke can be generated by placing smoke switch 13 in the ON position. With smoke switch 13 in the ON position, the temperature of resistive heat element 25 will increase and cause the fuel to smolder and produce smoke. In this manner, smoke can be generated on demand as it is needed.

Those of skill in the art will appreciate that variations in the size and composition of heating element 16 will require changes in the output of power source 17 in order to reach a temperature range that can cause the fuel to smolder in a relatively short period of time. With this understanding, heating elements can be constructed using a range of possible resistive heat elements and power sources. At one end of this range, resistive heat elements of shorter lengths of about 40 gage wires would be used in conjunction with a 1.5-volt power source (such as a "D" battery) and at the other end resistive heat elements of longer lengths of about 12 gage wires require use of a 24-volt power source. Preferably, the heating element will include a resistive heat element of about 25-35 inches of an 18-25 gage wire used in conjunction with a 12-18-volt power source. Combinations of resistive heat elements and power sources in this range can result in temperatures in the range of 800-1000 degrees Fahrenheit, which cause appropriate fuels to smolder in a relatively short period of time but not cause them to immediately burst into flame. As an example, in one embodiment, an 18-volt battery lithium-ion rechargeable battery is used with a 28 inch, 21 gage tungsten wire arranged in a coil. In another embodiment, a 33 inch, 20 gage nickel-chromium wire is arranged in a grill configuration and used in conjunction with an 18-volt battery lithium-ion rechargeable battery.

The amount of time required to produce enough smoke for use by bee keepers in controlling bees will vary slightly depending on the structures used for the heating element, power source, and fuel. For example, in a preferred embodiment using an 18-volt battery lithium-ion rechargeable battery in conjunction with a 28 inch, 21 gage tungsten wire arranged in a coil and dry wood shavings as fuel, a sufficient amount of smoke will be produced in approximately fifteen to thirty seconds.

Smoke generated in the bee smoker can be expelled, either with bellows used in conventional bee smokers or through use of an electrical air flow mechanism 21, which can be connected to power source 17 or another power source. By switching fan switch 14 to the ON position, air flow mechanism 21 will force smoke out the spout 19 of the bee smoker 10. The air flow mechanism can be any device of appropriate size and capacity, such as, for example, a 24 volt DC Brushless Blower Fan Model DB5015V24HBL available from Sofasco. The use of bellows or air flow mechanism 21 also aids in bringing air into the bee smoker 10 through vent 27, which can facilitate smoldering. In a preferred embodiment, as depicted in FIG. 1, an open gap is provided between air flow mechanism 21 and vent 27 so that ash and other debris can exit the bee smoker 10.

When smoke is no longer required by a bee keeper, smoke switch 13 can be turned OFF so that power source 17 and the fuel will not be unnecessarily depleted. In a preferred embodiment, this occurs automatically when the user is not actively causing the smoke switch 13 to be in the ON position through the use of a momentary contact switch or similar mechanism.

Figure 3:
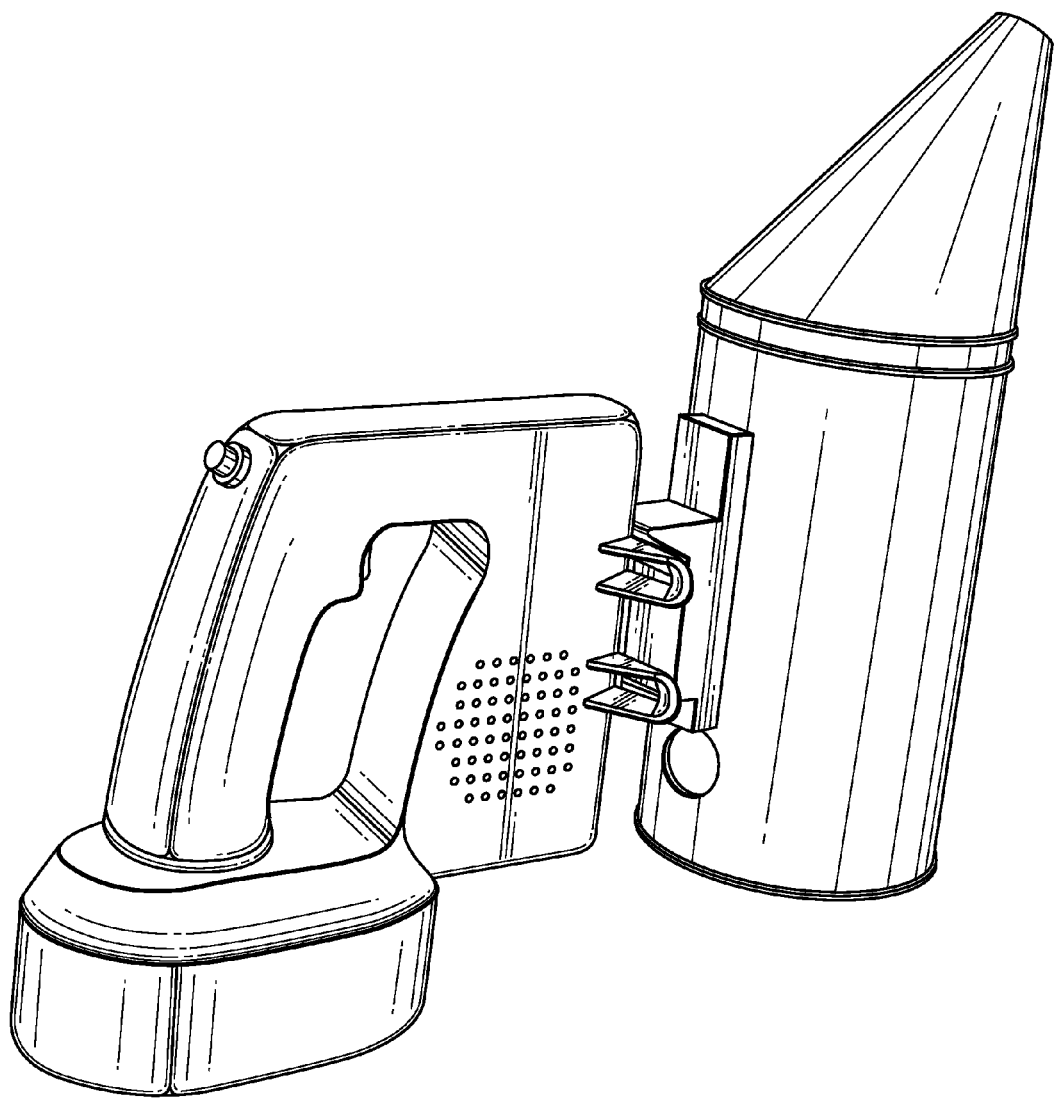
FIG. 3 is another embodiment of a bee smoker in accordance with the present invention.

FIG. 3 shows another perspective on an embodiment of the present invention.

Having described the invention with a certain degree of particularity, it is clear that changes can be made in the details of the invention without departing from the spirit and scope of the invention. The invention is not limited to the embodiments provided, but is to be limited only by the scope of the claims.

The invention claimed is:

1. A device for producing smoke on demand comprising:
a housing having a top end and a bottom end;
a funnel-like outlet at the top end of the housing;
a handle attached to the housing, the handle including a switch and an opening for receiving a user's fingers;
an air flow mechanism attached to the handle positioned to cause air to flow into the housing through a vent located near the bottom end of the housing, wherein the vent and air flow mechanism are open to ambient air therebetween and a gap is maintained between the air flow mechanism and the vent;
a battery power source located in the handle; and
a resistive heat element within the housing arranged such that the resistive heat element can be in contact with fuel placed in the housing, wherein the switch on the handle is operable connected to the resistive heat element.

2. A hand-held, portable bee smoker comprising:
a generally cylindrical metal housing having a top end and a bottom end;
a funnel-like outlet at the top end of the housing for dispensing smoke;
a handle attached to the housing, the handle including a switch and an opening for receiving a user's fingers;
an air flow mechanism on the handle positioned to cause air to flow into the housing through a vent located near the bottom end of the housing, wherein the vent and air flow mechanism are open to ambient air therebetween and a space is maintained between the air flow mechanism and the vent;
a battery power source located in the handle; and
a resistive heat element within the housing arranged such that the resistive heat element can be in contact with fuel placed in the housing, wherein the resistive heat element is capable of causing a sufficient amount of wood shavings to produce a sufficient amount of smoke for use in beekeeping activities within about 30 seconds after a user activates the resistive heat element with the switch.

3. The bee smoker of claim 2 wherein the resistive heat element is supported by a thermal and electrical insulating material.

4. The bee smoker of claim 3 wherein the thermal and electrical insulating material comprises a material selected from the group consisting of ceramic, silicone bonded muscovite, and silicone bonded phlogopite mica.

5. The bee smoker of claim 4 wherein the resistive heat element is a wire comprising a material selected from the group consisting of tungsten, ceramic, nickel-chromium, and carbon.

6. The bee smoker of claim 5 wherein the wire is between about a 12 gage and about a 40 gage wire.

7. The bee smoker of claim 6 wherein the wire is between about an 18 gage and about a 25 gage wire and the power source has a voltage of between about 12 volts and 18 volts.

8. The bee smoker of claim 7 wherein the wire is between about 20 and 40 inches in length.

* * * * *